(12) United States Patent
Massingill, Jr. et al.

(10) Patent No.: US 9,150,757 B2
(45) Date of Patent: Oct. 6, 2015

(54) DURABLE CERAMIC NANOCOMPOSITE THERMAL BARRIER COATINGS FOR METALS AND REFRACTORIES

(75) Inventors: John L. Massingill, Jr., San Marcos, TX (US); Clois E. Powell, Seguin, TX (US); Robert B. Habingreither, San Marcos, TX (US); Ray G. Cook, New Braunfels, TX (US)

(73) Assignee: Texas State University, San Marcos, TX (US)

( * ) Notice: Subject to any disclaimer, the term of this patent is extended or adjusted under 35 U.S.C. 154(b) by 0 days.

(21) Appl. No.: 13/817,467

(22) PCT Filed: Aug. 17, 2011

(86) PCT No.: PCT/US2011/048106
§ 371 (c)(1),
(2), (4) Date: May 1, 2013

(87) PCT Pub. No.: WO2012/024415
PCT Pub. Date: Feb. 23, 2012

(65) Prior Publication Data
US 2013/0209682 A1  Aug. 15, 2013

Related U.S. Application Data

(60) Provisional application No. 61/401,587, filed on Aug. 17, 2010.

(51) Int. Cl.
| | | |
|---|---|---|
| B05D 3/02 | (2006.01) | |
| C09D 183/16 | (2006.01) | |
| C04B 41/00 | (2006.01) | |
| C04B 41/45 | (2006.01) | |
| C04B 41/87 | (2006.01) | |
| C09D 7/12 | (2006.01) | |
| F41A 21/22 | (2006.01) | |
| C08K 3/34 | (2006.01) | |
| C08G 77/62 | (2006.01) | |

(52) U.S. Cl.
CPC ............ *C09D 183/16* (2013.01); *C04B 41/009* (2013.01); *C04B 41/4554* (2013.01); *C04B 41/87* (2013.01); *C08K 3/34* (2013.01); *C08K 3/346* (2013.01); *C09D 7/1266* (2013.01); *C09D 7/1275* (2013.01); *C09D 7/1291* (2013.01); *F41A 21/22* (2013.01); *C08G 77/62* (2013.01); *C08K 2201/011* (2013.01)

(58) Field of Classification Search
CPC .. C04B 41/009; C04B 41/4554; C04B 41/87; C04B 41/5059; C04B 14/104; C04B 41/4517; C04B 41/4535; C04B 41/457; C08K 3/34; C08K 3/346; C08K 2201/011; C09D 183/16; C09D 7/1266; C09D 7/1275; C09D 7/1291; F41A 21/22; C08G 77/62
USPC ........................................................ 427/387
See application file for complete search history.

(56) References Cited

U.S. PATENT DOCUMENTS

| | | | | |
|---|---|---|---|---|
| 5,021,533 | A * | 6/1991 | Schwark | 528/21 |
| 5,637,641 | A * | 6/1997 | Becker et al. | 525/102 |
| 5,843,526 | A * | 12/1998 | Lukacs III et al. | 427/228 |
| 7,377,919 | B2 * | 5/2008 | Heim et al. | 606/45 |
| 2003/0113657 | A1 * | 6/2003 | Nagahara et al. | 430/270.1 |
| 2005/0197444 | A1 * | 9/2005 | Kyte et al. | 524/480 |
| 2005/0272211 | A1 * | 12/2005 | Browne et al. | 438/296 |
| 2007/0106006 | A1 * | 5/2007 | Cooper et al. | 524/445 |
| 2007/0148442 | A1 * | 6/2007 | Shibayama et al. | 428/336 |
| 2008/0299400 | A1 * | 12/2008 | Furuya et al. | 428/447 |
| 2009/0092776 | A1 * | 4/2009 | Betz et al. | 428/34.7 |
| 2009/0326133 | A1 * | 12/2009 | Daly et al. | 524/445 |

* cited by examiner

*Primary Examiner* — Robert S Walters, Jr.
(74) *Attorney, Agent, or Firm* — Meyertons, Hood, Kivlin, Kowert & Goetzel, P.C.; Eric B. Meyertons

(57) ABSTRACT

A coating composition for metal or refractories includes a polysilazane resin; and one or more additives that alter the thermal conductivity and/or the abrasion resistance of the cured polysilazane resin. The coating composition may be applied to a metal or refractory material substrate and heated to form a ceramic layer on the substrate. The ceramic layer exhibits lower thermal conductivity and increased abrasion resistance.

19 Claims, No Drawings

DURABLE CERAMIC NANOCOMPOSITE THERMAL BARRIER COATINGS FOR METALS AND REFRACTORIES

BACKGROUND OF THE INVENTION

1. Field of the Invention

The invention generally relates to coatings for metals and refractory materials. More specifically, the invention relates to coatings for metals and refractory materials that provide improved heat and wear resistance to the coated material.

2. Description of the Relevant Art

Metals and refractory materials are used in many applications that involve high temperatures, pressures and stress. The eventual failure of these materials is typically due to a combination of heat weakening of the metal, wearing and corrosion, depending on the application. Metals used in applications such as firearm components (e.g., the barrel), internal combustion engines, deep sea drilling rigs, turbochargers, superchargers, high pressure pumps, structural metal (e.g., for high rise buildings, bridges, etc.) are all subjected to varying stresses that eventually lead to decreased strength or failure.

For example, it is known that firearm barrels become heated during use and such heating can lead to changes in the barrel that effect the accuracy or operation of the firearm. A firearm is a weapon that launches one, or many, projectile(s) at high velocity through confined burning of a propellant. The burning of the propellant fills the interior of an ammunition cartridge or the chamber of a firearm, leading to the expulsion of a bullet or shell. Heat produced by the burning propellant, as well as the heat produced by the projectile(s) are accelerated through the barrel, causes the temperature of the barrel to rise. As the temperature of the barrel rise, the barrel may change shape, changing the accuracy of the firearm and also loses some of its strength. If the firearm is being used to fire multiple projectiles at a rapid rate, the barrel will continue to heat up until, becoming softer and less accurate. If the heat is not properly dissipated by the barrel, the barrel will eventually undergo mechanical failure. The barrel, therefore, becomes the limiting factor for the rate at which projectiles can be fired from the firearm, and/or the velocity at which the projectiles are fired.

Metals and refractory materials may include a chromium coating. Chromium coatings reduce the friction between the components during operation. For example, in firearms, a chromium coating placed on the barrel bore will reduce the friction between the projectile and the barrel, producing less heat. A chromium coating may also provided increased resistance to corrosive materials.

Chrome is a heavy metal which is deposited onto the metal surface using, for example, aqueous electrodeposition. The chromic acid used in the deposition process is a hazardous substance and is a major problem when it comes to environmental pollution prevention efforts and worker safety. Hexavalent chromium, used in electrodeposition processes, is a known carcinogen which is difficult and expensive to dispose of.

It is desirable to have alternate coatings for metals and refractory materials that are not as toxic and are simpler to produce.

SUMMARY OF THE INVENTION

In an embodiment, a coating composition includes a polysilazane resin and one or more additives that alter the thermal conductivity and/or the abrasion resistance of the cured polysilazane resin.

The polysilazane, in some embodiments, is a polyureasilazane. In some embodiments, the polysilazane includes a compound having the general formula:

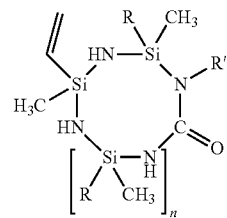

where R is H or CH=CH$_2$; R' is Ph; and n is 1 to 120. Linear and/or branched polysilazanes may also be used.

Additives include, but are not limited to aluminum silicate nanotubes (e.g., halloysite nanotubes), ceramic microspheres (e.g., hollow ceramic microspheres), heat reflecting pigments, smectites (e.g., montmorillonite), and combinations thereof.

In an embodiment, a method of forming the coating, on a substrate includes: applying a coating composition, as described above, to the substrate; and curing the applied coating composition. The substrate may be a metal substrate or a refractory material.

The coating may be applied using a spin coating process, a draw down method, a wet applicator, or combinations of these techniques.

Curing of the composition may be performed by heating the composition to a temperature of up to about 200° C. Alternatively, the composition may include a free radical initiator. Curing the composition may be performed by heating the composition to a temperature sufficient to activate the free radical initiator.

The cured coating composition may be converted into a ceramic layer by heating the cured coating composition to a temperature sufficient to convert at least a portion of the cured coating composition to a ceramic material. In some embodiments, the cured coating composition is heated to a temperature of greater than about 300° C. to form the ceramic layer. The coating composition may be heated to a temperature sufficient to produce an amorphous and/or crystalline ceramic material. Alternatively, the coating composition may be heated to a temperature sufficient to produce a crystalline ceramic material. The cured coating composition may be heated in ammonia, nitrogen, air, or oxygen atmosphere.

The formed ceramic layer exhibits lower thermal conductivity and improved abrasion resistance. In some embodiments, the ceramic layer includes amorphous silicon carbide, crystalline silicon carbide, silicon nitride, crystalline carbon nitride or combination thereof. The additives present in the ceramic layer lower thermal conductivity, increases hardness and increases the abrasion resistance of the ceramic layer, when compared to a ceramic layer prepared without additives.

In an embodiment, a firearm barrel includes an internal bore and a ceramic layer on an internal surface of the internal bore. The ceramic layer includes one or more additives that alter the thermal conductivity and/or the abrasion resistance of the ceramic layer.

The ceramic layer may be formed by applying a coating composition to the internal surface of the internal bore, wherein the coating composition includes a polysilazane resin. The coating composition may be applied to the internal surface using a spin coating process, a draw down method, or a wet applicator.

The applied coating composition may be cured to form a cured coating composition. The composition may be cured by heating the composition to a temperature of up to about 200° C. The composition, in some embodiments, may include a free radical initiator. In some embodiments, curing the composition includes heating the composition to a temperature sufficient to activate the free radical initiator.

The cured coating composition may be heated to a temperature sufficient to convert at least a portion of the cured coating composition to a ceramic material. In some embodiments, heating the cured coating composition to a temperature sufficient to convert at least a portion of the cured coating composition to a ceramic material comprises heating the cured coating composition to a temperature of greater than about 300° C. The coating composition may be heated to a temperature sufficient to produce an amorphous ceramic material. Alternatively, the coating composition may be heated to a temperature sufficient to produce a crystalline ceramic material. The cured coating composition may be heated in ammonia, nitrogen, air, or oxygen atmosphere.

In an embodiment, a piston includes an outer surface and a ceramic layer on the outer surface of the piston, wherein the ceramic layer includes one or more additives that alter the thermal conductivity and/or the abrasion resistance of the ceramic layer.

A turbine blade comprising an outer surface and a ceramic layer on the outer surface of the turbine blade, wherein the ceramic layer includes one or more additives will alter the thermal conductivity and/or the abrasion resistance of the ceramic layer.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

In an embodiment, a protective nanocomposite ceramic coating may be formed on a metal substrate or a refractory material substrate to improve wear resistance, corrosion resistance, and heat resistance. Ceramic coatings enable a quick implementation and practical way for production. Ceramic nanocomposite coatings may be used to improve wear resistance of firearm barrels, internal combustion engines and impart added heat resistance to structural metal for high rise buildings, deep sea drilling rigs, turbochargers, superchargers, and high pressure pumps.

As used herein the term "refractory material" refers to non-metallic materials having chemical and physical properties that make them applicable for structures, or as components of systems, that are exposed to environments above 500° C. Refractory materials (or "refractories") are generally ceramic materials. Refractory materials generally are composed of single or mixed high melting point oxides of elements such as silicon, aluminum, magnesium, calcium and zirconium. Non-oxide refractories also exist and include materials such as carbides, nitrides, borides and graphite.

In an embodiment, a ceramic coating may be formed on a metal substrate or a substrate composed of a refractory material using a pre-ceramic coating composition. The pre-ceramic coating composition is applied to the substrate and converted to a ceramic material. One or more additives may be present in the pre-ceramic coating composition that improves the properties of the formed ceramic coating. For example, additives may be used that lower the thermal conductivity and/or increase the abrasion resistance of the formed ceramic coating.

In an embodiment, a pre-ceramic coating composition may include a polysilazane resin. A polysilazane resin is composed of one or more polysilazanes. Polysilazane, as used herein, refers to oligomers, cyclic, polycyclic, linear, or branched compounds having at least three Si—N bonds. Examples of polysilazanes include cyclic and linear compounds having the general formula:

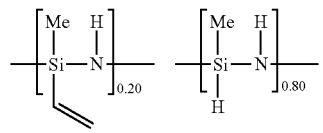

The subscripted value represents the average ratio of the components. The actual amount of each component present can be estimated using the average ratios and the molecular weight of the polysilazane.

The term "polysilazane" also encompasses polyureasilazanes and polythioureasilazanes. In an embodiment, a polyureasilazane has the structure:

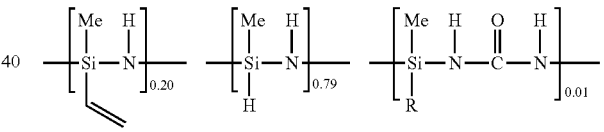

The subscripted value represents the average ratio of the components, and where R is H or CH=CH$_2$. The actual amount of each component present can be estimated using the average ratios and the molecular weight of the polyureasilazane.

In an embodiment, a polyureasilazane comprises a compound having the structure:

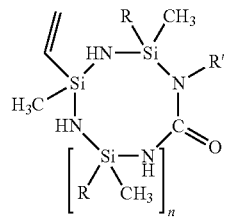

where R is H or CH=CH$_2$; R' is Ph; and n is 1-120.

Further examples of polysilazanes, and methods of making polysilazanes may be found, for example, in U.S. Pat. Nos. 4,929,704; 5,001,090; 5,021,533; 5,032,649; 5,155,181; and 6,329,487, all of which are incorporated herein by reference.

Polysilazanes are also commercially available from KiON® Corporation, Huntingdon Valley, Pa.

Polysilazane resins are liquid compositions that can be cured into a solid pre-ceramic thermoset, and then pyrolyzed into a ceramic material (e.g., silicon carbide or silicon nitride). Polysilazane resins may be cured using a free radical initiator. In some embodiments, peroxide free radical initiators may be used. Examples of peroxide free radical initiators include, but are not limited to dialkyl peroxides (e.g., dicumyl peroxide), peroxyketals, diperoxyesters (e.g., 2,5-dimethyl-2,5-di(2-ethylhexanoylperoxy)hexane), alkyl peroxyesters and peroxycarbonates. In some embodiments, 0.1 wt % to 5 wt % of one or more peroxide free radical initiator is sufficient to initiate cure. Depending on the free radical initiator employed, cure from liquid to solid thermoset can occur in times ranging from 1 to 90 minutes over a temperature range of 90° C. to 190° C.

Alternatively, cure can be affected by heating the composition to a temperature between about 150° C. and 250° C., in the absence of initiators. Temperatures greater than 200° C. may also be used for curing the composition without initiators. UV radiation may also be used (with or without a photoinitiator) to cure the polysilazane coating composition.

Upon curing of the liquid polysilazane, rigid solids result that are insoluble in common organic solvents, water, and dilute acids and bases. The cross linked solid is non-melting and does not flow or slump. On pyrolysis to ceramic, the "yield", an indication of mass conversion to ceramic material, as measured by thermal gravimetric analysis (TGA), is about 75% for polyureasilazane in both nitrogen and argon and about 95% in air; and is about 84% for polysilazane in both nitrogen and argon and about 95% in air.

Pyrolysis of polysilazane results in progressive conversion of the polymers to amorphous and ultimately crystalline ceramic phases. Typically, pyrolysis conducted at 1400° C. or less results in amorphous ceramics as determined by x-ray powder diffraction. Crystallization generally begins at temperature above 1400° C. The final phase is dependent upon the pyrolysis atmosphere and the presence of any fillers, which may seed particular ceramic phases; see Table 1. Crystal seeding influences the exact crystalline phase formed. For example, pyrolysis in argon in the presence of a SiC powder results in a SiC ceramic phase. Typically, crystal growth occurs epitaxially at the surface of the seed crystals, i.e., the crystal structure of the seed is reproduced in the newly formed material. Thus, templating influences are highly dependent on surface contact and the relative amounts of polymer and seed crystal. Heat from an electrical resistance heater may pyrolyze the coating into tough, flexible nanocomposite ceramic linings.

TABLE 1

Pyrolysis Composition (1600° C.) of CERASET Polyureasilazane

| Pyrolysis Atmosphere | Composition | Crystalline Phases |
|---|---|---|
| Argon | SiC | b-SiC |
| Nitrogen | SiC/$Si_3N_4$ | b-SiC, a-$Si_3N_4$, b-$Si_3N_4$ |
| Ammonia/Nitrogen* | $Si_3N_4$ | a-$Si_3N_4$, b-$Si_3N_4$ |
| Air·· | $SiC_xN_yO_z$/$SiO_2$ | a-$SiO_2$, a-$Si_3N_4$ |

*Ammonia to 800° C., then nitrogen to 1600° C.
··Pyrolysis composition dependent upon process conditions In some embodiments, it has been found that pyrolysis of polysilazane compositions may lead to the formation of carbon nitride on the coated substrate. In an embodiment, a polysilazane composition is initially cured by heating at a temperature between about 200° C. to about 400° C. in a nitrogen atmosphere. The initial cure times range from about 15 minutes to 2 hours. After the initial cure is completed, the pyrolysis is performed by heating the initially cured polysilazane composition to a temperature between about 600° C. and 1000° C. for a time ranging from about 15 minutes to two hours. Surprisingly, it was discovered that this process leads to the formation of substantial amounts of carbon nitride in the ceramic coating formed on the substrate. The carbon nitride, in some embodiments, is found in higher concentration at the surface of the coating and decreases (but does not disappear) toward the surface of the substrate. The formation of carbon nitride appears to be particularly prevalent when steel substrates are used.

In addition to a polysilazane resin, a pre-ceramic coating composition may also include additives that alter the thermal conductivity and/or the abrasion resistance of the cured polysilazane resin.

In one embodiment, a ceramic coating composition may include a nanoclay additive. Nanoclay additives may improve properties of the formed ceramic layer by decreasing gas permeability, increasing stiffness, provide better scratch resistance, improving heat deflection temperature, and improving thermo-mechanical response. In one embodiment, aluminum silicate nanotubes may be used as a nanoclay additive to alter the thermal conductivity and/or abrasion resistance of cured polysilazane. The aluminum silicate nanotubes may also be used to lower the thermal conductivity and/or increase abrasion resistance of the ceramic layer produced from the cured polysilazane. In one embodiment, aluminum silicate nanotubes are halloysite nantotubes. Halloysite is an inorganic aluminum silicate belonging to the kaolnite group of clay minerals. Aluminum silicate nanotubes are described in U.S. Pat. Nos. 6,401,816; 5,651,976; 5,492,696; 5,705,191; 6,280,759; 5,246,689; 4,098,676; 6,231,980; and 4,960,450; all of which are incorporated herein by reference. Since ceramic formulations are often brittle, the attributes of toughness and enhanced thermal barrier that aluminum silicate nanotubes contribute is valuable for many kinds of nanocomposite ceramic coatings.

Another additive material that may be present is microspheres. Microspheres are small spherical particles, with diameters in the micrometer range (typically 1 μm to 1000 μm (1 mm)). Microspheres may be made of glass, polymers, or ceramic materials. Ceramic microspheres may be solid microspheres or hollow microspheres.

In some embodiments, hollow ceramic microspheres are used as an additive for a coating composition to alter the thermal conductivity and/or abrasion resistance of the cured polysilazane resin and of the formed ceramic layer. Hollow ceramic microspheres generally have a wall thickness about 1/10 of the diameter of the microsphere, a compressive strength of about 6500 psi, a softening point of about 1800° C., and a thermal conductivity of ~0.1 W/m/° C. Thus, hollow microspheres act like a mini insulating layer when dispersed in a coating. Hollow ceramic microspheres also reduce material expansion. Reducing material expansion will help reduce tensile axial stress failures. Ceramic microspheres (solid and hollow) are commercially available from 3M Corporation, Minneapolis, Minn.

In some embodiments, Infrared reflecting pigments may be used as an additive for a coating composition to alter the thermal conductivity of the cure polysilazane resin and of the formed ceramic layer. Infrared reflective pigments are pigments that reflect light in the wavelengths in the infrared region, in addition to reflecting some visible light selectively. Infrared reflecting pigments are described in U.S. Pat. Nos.

3,998,752; 5,405,680; and 5,811,180, and U.S. Published Patent Application Nos.: 2006/0159922; 2005/012644; 2002/6454848; 2003/6521038; and 2002/6468647, all of which are incorporated herein by reference.

Polysilazane resins offer ease of processing, low temperature cure, and excellent shelf stability. Hollow ceramic beads provide radiant heat reflection, insulation and thermal barrier. Hollow nanotubes can be used for adjusting viscosity, improving polysilazane strength, and increasing the thermal barrier. Thus the combination of polysilazane and one or more additives as described herein, may be used to produce enhanced ceramic coatings for metal substrates and refractories.

In one embodiment, a coating is produced on a substrate. The substrate may be metal or a refractory material. In an embodiment, a coating composition is applied to the substrate. The coating composition includes a polysilazane resin and one or more additives that alter the thermal conductivity and/or the abrasion resistance of the cured polysilazane resin. The coating composition may be applied to the substrate using a variety of methods including, but not limited to, a spin coating process, a draw down process, or by using a wet applicator. Generally, any process capable of applying a thin coat of the coating composition to the substrate may be used.

After the coating composition is applied to the substrate, the coating composition is cured to a solid. As noted above, a coating composition that includes a polysilazane resin may be cured using thermal curing, free radical initiators, or ultraviolet light. In one embodiment, the coating composition is cured by heating the coating composition to a temperature between about 150° C. and 250° C.

In another embodiment, the coating composition includes a free radical initiator. Curing the composition is accomplished by heating the composition to a temperature sufficient to activate the free radical initiator. Activation of the free radical initiator produces radicals that cause cross linking reactions within the coating composition, creating a solid coating layer.

The cured coating composition may be further heated to a temperature sufficient to convert at least a portion of the cured coating composition to a ceramic material. Formation of the ceramic material is generally accomplished by heating a coating composition that includes a polysilazane resin to a temperature greater than about 300° C. The ceramic layer may be amorphous or crystalline, depending on the temperature used. In some embodiments, the cured coating composition is heated to a temperature sufficient to produce an amorphous ceramic material. An amorphous ceramic material may be produced by heating the cured coating material to a temperature greater than 300° C., but less than 1400 C. In another embodiment, a crystalline ceramic material may be produced by heating the cured coating material to a temperature greater than 1400° C.

In some instances, it may not be necessary to heat the coating composition directly to form the ceramic layer. In some embodiments, the component will be subjected to high temperatures during normal use. For example, engine parts or firearm barrels are heated when used. In some embodiments, the heat produced during use of the coated substrate will be sufficient to convert a cured coating composition disposed on the substrate into a ceramic layer.

As noted above, in Table 1, the composition of the formed ceramic layer may be altered by the atmosphere used during the ceramic formation process. In some embodiments, the ceramic material is a silicon nitride material formed by heating the cured coating composition in a nitrogen atmosphere. Crystal seeding influences the exact crystalline phase formed; for example, pyrolysis in argon in the presence of a SiC powder results in a SiC ceramic phase. Pyrolysis in of the coating composition in the presence of $Si_3N_4$ seed crystals tends to favor a $Si_3N_4$ ceramic layer. Typically, crystal growth occurs epitaxially at the surface of the seed crystals, i.e., the crystal structure of the seed is reproduced in the newly formed material.

Ceramic coatings as described herein may be formed on metal substrates or refractory substrates in a variety of applications. Examples of applications that may include on or more components that have been coated with a ceramic layer include, but are not limited to, off shore drilling rig components, structural steel in high rise buildings, down hole drilling pipe, gun barrels, internal combustion engine parts, extruder screws, turbochargers, superchargers, and high pressure pumps.

Ceramics and ceramic composites in many cases offer an "enabling" capacity which will allow applications or performance that could not otherwise be achieved. In one embodiment, ceramic coatings may be used to improve firearm barrels. The material requirements for a firearm barrel liner are given in Table 2, and the properties of ceramic and metals compared. The weaknesses of conventional ceramics are thermal shock resistance, toughness, and impact strength. Gun barrels with pre-formed ceramic liners inserted have been found to have outstanding abrasion resistance, but preparation and brittleness of the preformed ceramic liners have been problems.

TABLE 2

| Property | Ceramic | Metal |
| --- | --- | --- |
| High Melting Temperature | x | |
| High Temperature Strength | x | |
| Thermal Shock Resistance | | x |
| Resistance to Hot Gas Erosion | x | |
| Low Coefficient of Thermal Expansion (CTE) | x | |
| Low Young's Modulus | | x |
| High Toughness/Impact Strength | | x |

The properties of ceramics and metals are compared in Table 3. Failure of brittle ceramic (see Table 3, Fracture Toughness) firearm-barrel liners during single-shot and burst firing events continues to be studied. The results obtained reveal that due to thermal expansion of the steel jacket during single-shot and burst ballistic events, tensile axial stresses develop in the ceramic lining near the barrel ends. These stresses are sufficiently high, particularly in the case of burst firing, that they can induce formation of circumferential cracks and, in turn, failure of the lining. The coefficients of thermal expansion (CTE) of a metal firearm barrel and ceramic liner must match over the wide temperature variations in the operating gun barrel or stress will lead to subsequent failure without sufficient coating toughness, flexibility, and reinforcement.

TABLE 3

| Property | SiC | $Si_3N_4$ | Steel | Ta—10W |
| --- | --- | --- | --- | --- |
| Maximum Use Temperature, ° C. | 2300 | 1800 | 1500 | 3000 |
| Tensile Strength @ 25° C. (MPa) | 450 | 700 | 970 | 750 |
| Compressive Strength (MPa) | 3850 | 5650 | 970 | 750 |
| Young's Modulus (GPa) | 410 | 305 | 210 | 195 |

TABLE 3-continued

| Property | SiC | $Si_3N_4$ | Steel | Ta—10W |
|---|---|---|---|---|
| Hardness (kg/mm$^2$) | 2900 | 1900 | 300 | 275 |
| Coefficient of Thermal Expansion | $5 \times 10^{-6}$ | $3 \times 10^{-6}$ | $15 \times 10^{-6}$ | $11 \times 10^{-6}$ |
| Thermal Conductivity | 125 | 25 | 60 | 50 |
| Fracture Toughness | 4 | 6 | 120 | — |
| Density (g/cm$^2$) | 3.2 | 3.2 | 7.9 | 16.8 |

In one embodiment, a coating is produced in a firearm barrel. The firearm barrel comprises an internal bore and the coating is formed on the interior surface of the internal bore. In an embodiment, a coating composition is applied to the interior surface of the firearm barrel. The coating composition includes a polysilazane resin and one or more additives that alter the thermal conductivity and/or the abrasion resistance of the cured polysilazane resin. The coating composition may be applied to the substrate using a variety of methods including, but not limited to, a spin coating process, a draw down process, or by using a wet applicator.

After the coating composition is applied to the substrate, the coating composition is cured to a solid. As noted above, a coating composition that includes a polysilazane resin may be cured using thermal curing, free radical initiators, or ultraviolet light. In one embodiment, the coating composition is cured by heating the coating composition to a temperature between about 150° C. and 250° C.

In other embodiments, the coating composition includes a free radical initiator. Curing the composition is accomplished by heating the composition to a temperature sufficient to activate the free radical initiator. Activation of the free radical initiator produces radicals that cause cross linking reactions within the coating composition, creating a solid coating layer.

The cured coating composition may be further heated to a temperature sufficient to convert at least a portion of the cured coating composition to a ceramic material. Formation of the ceramic material is generally accomplished by heating a coating composition that includes a polysilazane resin to a temperature greater than about 300° C. The ceramic layer may be amorphous or crystalline, depending on the temperature used, as discussed above. In some embodiments, the temperature used to form the ceramic liner is less than the temperature used to temper the metal of the firearm barrel.

The coating compositions and ceramic coatings described herein may be used in other applications. For example, ceramic coatings may be formed on pistons of engines or pumps. Pistons are metal components that undergo high temperatures and, in some instances, high friction. For example, pistons that are components of positive displacement pumps for mining operations are subjected to high abrasion due to the high solids content of the fluids being pumped. Pistons in internal combustion engines are subjected to high temperature, which cause fatigue. The application of a ceramic coating as described herein may help to protect piston heads in engines or pump from these conditions.

In other embodiments, coating compositions and ceramic coatings described herein may be used as turbine blade thermal barrier coatings (TBC) to protect the turbine blade metal from heat and erosion damage. Porosity in the TBCs is reported to improve the thermal barrier properties of the coatings. The coating compositions and ceramic coatings can, if desired, develop microporosity that will improve thermal stress resistance of the TBC and add to the thermal barrier properties of the ceramic nanocomposite liners. Multiple coats could produce a dense non-porous barrier layer at the barrel interface, with a porous thermal barrier ceramic at the air interface.

Airplane components are subjected to high heat and stress. For example, jet engines experience high temperature due to the high speeds that the turbines are turning. Titanium, while being lightweight and strong, is not stable to the generally high temperatures that are present in jet engines. For example, it is known that titanium components begin to oxidize at temperatures exceeding 1000° C. The oxidized titanium has significantly less strength and eventually leads to component failure. Protection of titanium components may be achieved by forming a ceramic coating layer on the components using the coating compositions described herein.

Other aircraft components, such as landing gear components, are subjected to high stress and varied temperatures. The design of landing gear components also makes then susceptible to allowing dirt and other materials to enter the landing gear, causing friction in the components (e.g., shock absorbers). Ceramic coatings, as described herein, placed on one or more of the components may help to reduce the failure of landing gears due to abrasion, corrosion, and stress.

* * *

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Preparation of a Ceramic Lined Gun Barrel for Live Fire Evaluation

KDT HTT 1800 (KiON Corporation, Charlotte, N.C.) was employed to produce a ceramic lining in a firearm barrel. A custom prepared firearm barrel (a universal receiver barrel) was purchased to be specifically utilized with the firing mechanism at Southwest Research Institute for the live fire evaluation. The barrel was prepared by Bill Wiseman and Co. The barrel had a 1-in-12 rate of twist with six lands and groves. The caliber of the barrel was 5.56 mm (chambered for NATO cartridge). The barrel was sealed with tape at one end. Ten ml. of KDT HTT 1800 was poured into the barrel. The barrel was tilted at a 45° angle to let the air escape. After the resin was poured into the barrel, the barrel was allow to set for about 5 min. to allow bubbles to escape from the coating. The open end of the barrel was then sealed with tape. The barrel was rolled on a table for 10 min. The angle of the barrel to the table was altered to allow the polymer to coat the entire barrel. At the end of the 10 min coating process, one end of the barrel was unsealed and the excess polymer was drained. The remaining seal was removed from the barrel. The barrel was positioned vertical allowing for excess polymer to drain out of the barrel (15 min). After the excess polymer was removed from the barrel, the coating was "green cured" at 300° C. for one hour in a nitrogen atmosphere. A nitrogen atmosphere was chosen based on previous work comparing coating cured in air and nitrogen). The cure was finished in a 800° C. oven for 30 min. After the barrel has cooled, cleaning cloth was utilized to remove any residue. The barrel was finally purged with dry nitrogen.

Live Fire Evaluation of the Above Barrel at SWRI

The live fire evaluation of the above ceramic coated firearm barrel was accomplished at the Ballistics and Explosives Section at Southwest Research Institute. The protocol was 1 shot with visual inspection of the barrel, followed by 5 shots with visual inspection and finally 30 shots with visual inspection. The rounds were military M855 manufactured at Lake City Arsenal in 2004. The ammunition was fired in "as manufactured" condition.

During use, the barrel is aligned in an autofire system with a bore mounted laser. The muzzle velocities of the projectiles were measured by two sets of Oehler Model 57 photoelectric chronographs located between the gun mount and the target.

The spacing between the chronographs was 59 inches. Hewlett Packard HP 53131A counters (previously calibrated) recorded the time for the projectile to travel between chronograph screens. Velocity was calculated as a function of time and distance traveled. Two calculations for each round fired was averaged for the recorded muzzle velocity.

There was no change in the condition of the bore during the live fire evaluation. There was the expected propellant residue. The bore seemed to be smoother (higher gloss) as the firing proceeded. There was no significant change in muzzle velocity as the testing proceeded. (see Table 4 below).

TABLE 4

Recorded Muzzle Velocity and Shot Times

| Test # | Threat | Velocity (fps) | Time | Comments |
|---|---|---|---|---|
| 1 | M855 | 3,202 | 12:55 | Inspected |
| 2 | M855 | 3,194 | 12:58 | |
| 3 | " | 3,226 | 12:59 | |
| 4 | " | 3,203 | 1:00 | |
| 5 | " | 3,172 | 1:01 | |
| 6 | " | 3,215 | 1:01 | Inspected - Barrel warm to the touch. |
| 7 | M855 | 3,227 | 1:06 | |
| 8 | " | 3,216 | 1:07 | |
| 9 | " | 3,256 | 1:07 | |
| 10 | " | 3,167 | 1:08 | |
| 11 | " | 3,246 | 1:09 | |
| 12 | " | 3,246 | 1:10 | |
| 13 | " | 3,189 | 1:11 | |
| 14 | " | 3,198 | 1:11 | |
| 15 | " | 3,208 | 1:12 | |
| 16 | " | 3,218 | 1:13 | |
| 17 | " | 3,198 | 1:13 | |
| 18 | " | 3,197 | 1:14 | |
| 19 | " | 3,226 | 1:15 | |
| 20 | " | 3,237 | 1:16 | |
| 21 | " | 3,213 | 1:17 | |
| 22 | " | 3,232 | 1:17 | |
| 23 | " | 3,178 | 1:18 | |
| 24 | " | 3,195 | 1:19 | |
| 25 | " | 3,160 | 1:20 | |
| 26 | " | 3,235 | 1:21 | |
| 27 | " | 3,212 | 1:21 | |
| 28 | " | 3,235 | 1:22 | |
| 29 | " | 3,208 | 1:23 | |
| 30 | " | 3,188 | 1:24 | |
| 31 | " | 3,259 | 1:25 | |
| 32 | " | 3,211 | 1:25 | |

TABLE 4-continued

Recorded Muzzle Velocity and Shot Times

| Test # | Threat | Velocity (fps) | Time | Comments |
|---|---|---|---|---|
| 33 | " | 3,183 | 1:26 | |
| 34 | " | 3,200 | 1:27 | |
| 35 | " | 3,224 | 1:28 | |
| 36 | " | 3,199 | 1:28 | Inspected - Barrel hot to the touch. |

Analysis of the Ceramic Coating on the Inside of the Gun Barrel after the Live Fire Test The muzzle end of the barrel (two inches from the end) was removed with a diamond impregnated wet sectioning saw. This end (the two inch piece) was cut into two pieces with the diamond saw. One piece was mounted and polished. No etching of the specimen was done. Mounting was done with phenol-resorcinol (Bakelite) resin which has high edge retention properties. This aided in the coating evaluation process due to the thickness of the layer and the potential for the layer to be brittle. It was noticed that the ceramic coating remains in the barrel after live firing, the thickness of the ceramic coating is almost identical to the thickness of the ceramic coatings evaluated on the metal plates previously reported, and the crystallinity seems to be enhanced by the live fire.

As a result of the testing it was determined that:
1. Gun barrels were successfully coated on the inside with a ceramic coating through thermal initiation of polymer KDT HTT 1800.
2. The ceramic coating successfully survives 36 rounds of live fire at the 5.56 caliber.
3. Muzzle velocity of the projectiles is not affected by the ceramic coating.

Increased Thermal Barrier with Nanoparticles

Three different nano-technologies were evaluated using KDT HTT 1800 for improving thermal barrier in polymers. The three technologies evaluated were hollow glass spheres, montmorillonite (Cloisite Na), and hollow clay tubes (halloysite; HNT). The three technologies were evaluated at 5 weight percent in KDT HTT 1800. The nanoparticles were mechanically blended into KDT HTT 1800 at room temperature. The hollow glass spheres floated to the top of the KDT HTT 1800, and were not dispersible in the resin.

The evaluation of the thermal barrier behavior of the dispersions followed the protocol described below. The dispersions were drawn down on 32 mil. thick steel Q panels. The Q panels were degreased with acetone before the coatings were applied. The thickness of the coatings was 20 mil. The coated Q panels were placed into a 300° C. oven for one hour in a nitrogen atmosphere. The panels were removed and allowed to cool to room temperature and allowed to remain at room temperature for one day. Then panels were then placed into an 800° C. oven for 30 min. with a nitrogen atmosphere. At the end of 30 min. the oven was turned off and the oven door was opened slightly to allow for a slow cooling back to room temperature.

The thermal barrier performance was determined with a propane torch. The flame of the torch was adjusted to 1.5 in. The coated side of the Q panels was oriented 1.0 in. from the tip of the flame from the torch. The temperature of the back side of the Q panel was monitored with an infrared thermometer. The temperature was recorded every minute from 0 minutes to 10 minutes. The uncoated Q panel was the control (referred to as the "Blank" in the following data). Each coating type was run in duplicate. The results are found below in Table 5.

TABLE 5

Blank

| min | 0 | 1 | 2 | 3 | 4 | 5 | 6 | 7 | 8 | 9 | 10 |
|---|---|---|---|---|---|---|---|---|---|---|---|
| (F. °) | 77 | 353 | 427 | 450 | 460* | 461* | 460* | — | — | — | — |

*Standard Deviation: 460.33 (+/−) 0.4714 (F. °)

1800

| | min | 0 | 1 | 2 | 3 | 4 | 5 | 6 | 7 | 8 | 9 | 10 |
|---|---|---|---|---|---|---|---|---|---|---|---|---|
| (F. °) | #1 | 82 | 380 | 410 | 422 | 448* | 443* | 436 | 445* | 449* | 435 | 450* |
| (F. °) | #2 | 80 | 395 | 422 | 420 | 431* | 426 | 431* | 435* | 436* | 432* | 434* |

*Standard Deviation: 1800
1 = 447 (+/−) 2.61(F. °), 1800
2 = 433.16 (+/−) 1.95 (F. °)

1800/Cloisite Na

| | min | 0 | 1 | 2 | 3 | 4 | 5 | 6 | 7 | 8 | 9 | 10 |
|---|---|---|---|---|---|---|---|---|---|---|---|---|
| (F. °) | #1 | 90 | 344 | 397 | 400 | 409 | 412* | 415* | 393 | 415* | 416* | 418* |
| (F. °) | #2 | 109 | 340 | 378 | 399 | 408* | 411* | 408* | 407* | 392 | 406* | 401* |

*Standard Deviation: 1800/Cloisite Na
1 = 415.2 (+/−) 1.94 (F. °), 1800/Cloisite Na
2 = 406.83 (+/−) 3.02 (F. °)

1800/Microspheres

| | min | 0 | 1 | 2 | 3 | 4 | 5 | 6 | 7 | 8 | 9 | 10 |
|---|---|---|---|---|---|---|---|---|---|---|---|---|
| (F. °) | #1 | 112 | 312 | 330 | 393 | 394 | 397 | 408* | 410* | 414* | 424 | 413* |
| (F. °) | #2 | 100 | 368 | 372 | 401 | 407* | 401* | 391 | 410* | 404* | 398* | 389 |

*Standard Deviation: 1800/Microspheres
1 = 411.25 (+/−) 2.38 (F. °), 1800/Microspheres
2 = 404 (+/−) 4.24 (F. °)

1800/Halloysite tubes

| | min | 0 | 1 | 2 | 3 | 4 | 5 | 6 | 7 | 8 | 9 | 10 |
|---|---|---|---|---|---|---|---|---|---|---|---|---|
| (F. °) | #1 | 100 | 268 | 311 | 323 | 315 | 346* | 340* | 345* | 370 | 351* | 352* |
| (F. °) | #2 | 108 | 267 | 297 | 300 | 323* | 322* | 324* | 340 | 334* | 337* | 325* |

*Standard Deviation: 1800/Halloysite tubes
1 = 346.8 (+/−) 4.35 (F. °), 1800/Halloysite tubes
2 = 327.5 (+/−) 5.80 (F. °);
**All outliers due to flame variability and non-uniform coated areas (e.g. Q panel areas which may have had ceramic coating flaked off or other reasons for non-uniformity of the coat on the panel which may affect the thermal conductance of the panel) were unaccounted in the calculation of the standard deviation of the thermal conductance temperatures of the panels.

One can readily determine from the data above that the KDT HTT 1800 with 5 weight percent hollow nanotubes (halloysite) was significantly superior in thermal barrier performance when compared to the KDT HTT 1800 and the KDT HTT 1800 with 5 weight percent montmorillonite (Cloisite Na) or hollow glass spheres (microspheres).

With regard to the 5 weight percent loaded KDT HTT 1800 with the hollow nanotubes, the formulation gradually increased in viscosity at room temperature over several days until the dispersion gelled. Crosslinking of the polymer appears to occur with time at room temperature when the hollow nanotubes are present. The KDT HTT 1800 has a viscosity of water (low). The addition of the hollow nanotubes in the formula can be used to adjust the viscosity to any desired value with time.

Increased Hardness of KDT HTT 1800 with Nanoparticles

The hardness of the ceramic coatings was evaluated by a Mitutoyo Rockwell Hardness Testing Machine HR-500 series set at HR15T. The hardness test results are from the coated steel Q panels that were evaluated above for thermal barrier performance with the torch. Ten random tests were done on each panel. These test sites included the area of the panel that was directly exposed to the flame and those sites on the panel that were not directly exposed to the flame. The results are found below in Table 6. The KDT HTT 1800 columns are the hardness values for the pure KDT HTT 1800 ceramic. The MS hardness values are for the microspheres in KDT HTT 1800. The HNT columns are the hardness values for the halloysite hollow nanotubes in KDT HTT 1800. The C hardness numbers are for Cloisite Na (montmorillonite) in KDT HTT 1800. One can see that the hollow nanotube values are generally higher and more consistent than all of the other hardness values listed as categories in Table 6.

TABLE 6

Hardness testing on coated side of Q panel by Mitutoyo Rockwell Hardness Testing Machine HR-500 Series set at HR15T

|    | 1800#1 | 1800#2 | MS#1 | MS#2 | HNT#1 | HNT#2 | C#1  | C#2  |
|----|--------|--------|------|------|-------|-------|------|------|
| 1  | 74.5   | 72.7   | 82.8 | 78.6 | 78.2  | 80.4  | 67.0 | 78.1 |
| 2  | 73.8   | 69.6   | 73.8 | 74.9 | 82.0  | 80.2  | 83.0 | 76.0 |
| 3  | 74.7   | 69.9   | 77.3 | 69.0 | 79.0  | 77.4  | 77.3 | 79.2 |
| 4  | 72.6   | 75.3   | 80.3 | 77.7 | 79.0  | 80.2  | 80.2 | 82.6 |
| 5  | 79.3   | 76.1   | 82.3 | 77.1 | 78.2  | 82.4  | 78.0 | 72.1 |
| 6  | 77.6   | 81.7   | 71.5 | 77.7 | 80.6  | 83.2  | 72.6 | 82.7 |
| 7  | 83.4   | 80.5   | 81.3 | 76.1 | 82.5  | 81.5  | 75.1 | 81.6 |
| 8  | 76.6   | 76.5   | 81.6 | 74.8 | 79.0  | 79.6  | 78.5 | 78.1 |
| 9  | 72.6   | 71.8   | 81.7 | 68.8 | 78.2  | 81.5  | 79.1 | 76.2 |
| 10 | 73.6   | 71.5   | 74.8 | 75.4 | 76.4  | 80.4  | 84.9 | 78.0 |

Microscopic Evaluation of the HNT-1800 Nanocomposite Coating

The coated Q panels were cut with a band saw to a 1 inch by 4 inch section. This section was machined to a 1 inch by 2 inch section with a diamond saw. This section was machined further with the diamond saw to a 0.25 inch by 1 inch section. The section was mounted with a protective clip. The thicker side of the clip protected the non-coated side of the panel and the thinner side of the clip protected the coated side of the panel. Bakelite (green is color) was employed to mount the sample. The Bakelite was cured with heat and pressure for 15 min. The mounted sample was then cooled for 15 min. The mounted sample was polished until the protective clip was completely visible. The mounted sample edge was viewed with a Nikon Epiphot 300. The coating exhibited porosity that improves the thermal barrier property of the 1800 without a sacrifice in hardness.

Evaluation of HNT-1800 Nanocomposite Coatings at Higher HNT Loading

Dispersions of HNT in KDT HTT 1800 were evaluated at 10 and 15 weight percent loadings. The same protocol was employed to prepare these dispersions as described for the preparation of the 5 weight percent dispersion found above. The evaluation of these higher loaded dispersions on Q panels were identical to protocol described above for the 5 weight percent dispersion. There was no change in hardness of the coatings after the final 800° C. cure.

Evaluation of the Performance of a Second Coating of the 5 Weight Percent HNT-1800 Nanocomposite A second coating of the 5 weight percent HNT-1800 was applied onto the initial cured HNT-1800 coating that was evaluated above. There was no change in the hardness of the double coating after cure at 800° C.

Conclusion

1. The addition of HNT at 5 weight percent to KDT HTT 1800 produced a coating after cure that had superior thermal barrier and hardness performance when compared to pure KDT HTT 1800, 5 weight percent loaded KDT HTT 1800 with hollow glass spheres, and 5 weight percent loaded KDT HTT 1800 with montmorillonite (Cloisite Na).
2. The cured coating of KDT HNT 1800 at 5 weight percent HNT appears to have enhanced porosity (without a sacrifice of hardness).
3. Higher loading levels of HNT in KDT HTT 1800 (10 and 15 weight percent) did not improve the hardness of the cured coating.
4. A second coat of the 5 weight percent HNT-1800 loaded nano-dispersion did not increase the hardness of the coating after cure.

Initial Energy Dispersive Spectroscopy (EDS) Generated by Scanning Electron Microscopy (SEM)

EDS evaluations of the ceramic coating employed to increase the thermal stability of machine gun barrels was performed. During the evaluation, the electron beam of the SEM hits the atoms in the ceramic coating and excites the electrons associated with each atom. As the electrons return to their original energy levels, x-rays are emitted. The energy of the x-rays (measured by the SEM) corresponds to specific atoms. Hence, the EDS analysis can be used as an elemental analysis technique. In a test, an evaluation of a ceramic coating that has been removed from the steel substrate was performed by focusing the electron beam from the SEM on the cross section of the ceramic coating. The weight percent of each element found was determined from the resulting data. The following weight percentages were found: C—15.96%; N—4.48%; O—34.19%; Fe—45.38%.

It was noted that silicon is absent from the coating. In the open literature that describes the thermal decomposition of the silazanes, silica carbide and silica nitride are the main products. With the conditions that are utilized to prepare the ceramic coating from KDT HTT 1800 silazane, silica is conspicuous in its absence from the previously reported WAXS and in the above EDS evaluation. The amount of nitrogen seems to be low if one considers carbon nitride as the product in the above evaluation (the WAXS in the previous reports indicates carbon nitride as a major product).

The coating surface was also analyzed by the same process. The weight percent of each element found was determined from the resulting data. The following weight percentages were found: C—28.16%; N—12.37%; O—13.09%; Si—46.38%. We noted that silica appears on the surface. Coupling this information with our previous studies indicates that the silica is probably amorphous (non-crystalline silica will not appear in the WAXS). Notice also that iron is absent. Iron appears to be segregated away from the surface of the ceramic coating and increases in concentration as the steel surface is approached.

Conclusions

1. Silica is found mainly at the surface of the ceramic coating in an amorphous form (not observable by WAXS).
2. Iron in the ceramic coating is not at the surface of the coating and is found mainly toward the surface of the steel.
3. Carbon and nitrogen (carbon nitride) is found in higher concentration at the surface of the coating and decreases (but does not disappear) toward the surface of the steel.

4. The heterogeneity of the ceramic coating presumably accounts for the high hardness, durability, and low coefficient of friction at the surface and the excellent adhesion at the steel interface.

\* \* \*

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:
1. A coating composition comprising:
a polyureasilazane resin having the general formula:

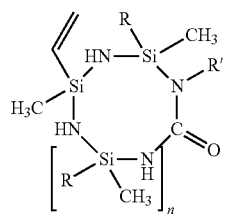

where R is H or CH=CH$_2$; R' is Ph; and n is 1 to 120; and one or more additives wherein the additives comprise nanoclay additives, ceramic microspheres, infrared reflecting pigments, or combinations thereof.

2. The coating composition of claim 1, wherein the one or more additives comprise aluminum silicate nanotubes.

3. The coating composition of claim 1, wherein the one or more additives comprise halloysite nanotubes.

4. The coating composition of claim 1, wherein the one or more additives comprise solid ceramic microspheres.

5. The coating composition of claim 1, wherein the one or more additives comprise hollow ceramic microspheres.

6. The coating composition of claim 1, wherein the one or more additives comprise a smectite clay.

7. A method of forming a coating, on a substrate comprising:
applying a coating composition to the substrate, wherein the coating composition comprises: a polyureasilazane resin having the general formula:

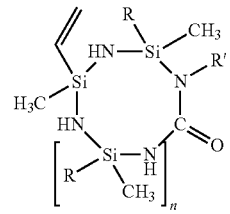

where R is H or CH=CH$_2$; R' is Ph; and n is 1 to 120 and; one or more additives, wherein the additives comprise nanoclay additives, ceramic microspheres, infrared reflecting pigments, or combinations thereof; and
curing the applied coating composition.

8. The method of claim 7, wherein the substrate comprises a metal substrate.

9. The method of claim 7, wherein the substrate is composed of a refractory material.

10. The method of claim 7, wherein the composition is applied to the substrate using a spin coating process.

11. The method of claim 7, wherein the composition is applied to the substrate using a draw down method.

12. The method of claim 7, wherein the composition is applied to the substrate using a wet or spray applicator.

13. The method of claim 7, wherein curing the composition comprises heating the composition to a temperature of up to about 200° C.

14. The method of claim 7, wherein the composition further comprises a free radical initiator, and wherein curing the composition comprises heating the composition to a temperature sufficient to activate the free radical initiator.

15. The method of claim 7, further comprising heating the cured coating composition to a temperature sufficient to convert at least a portion of the cured coating composition to a ceramic material.

16. The method of claim 15, wherein heating the cured coating composition to a temperature sufficient to convert at least a portion of the cured coating composition to a ceramic material comprises heating the cured coating composition to a temperature of greater than about 300° C.

17. The method of claim 15, wherein heating the cured coating composition to a temperature sufficient to convert at least a portion of the cured coating composition to a ceramic material comprises heating the cured coating composition to a temperature sufficient to produce an amorphous ceramic material.

18. The method of claim 15, wherein heating the cured coating composition to a temperature sufficient to convert at least a portion of the cured coating composition to a ceramic material comprises heating the cured coating composition to a temperature sufficient to produce a crystalline ceramic material.

19. The method of claim 15, wherein heating the cured coating composition to a temperature sufficient to convert at least a portion of the cured coating composition to a ceramic material comprises heating the cured coating composition in a nitrogen atmosphere.

\* \* \* \* \*